(12) United States Patent
Arntsen et al.

(10) Patent No.: US 9,261,650 B2
(45) Date of Patent: Feb. 16, 2016

(54) CONFIGURABLE OPTICAL COUPLING (71) Applicant: Laser Light Engines, Inc., Salem, NH (US)

(72) Inventors: John Arntsen, Manchester-by-the-Sea, MA (US); Barret Lippey, Belmont, MA (US)

(73) Assignee: Laser Light Engines, Inc., Salem, NH (US)

( * ) Notice: Subject to any disclaimer, the term of this patent is extended or adjusted under 35 U.S.C. 154(b) by 81 days.

(21) Appl. No.: 14/168,639

(22) Filed: Jan. 30, 2014

(65) Prior Publication Data

US 2015/0212272 A1    Jul. 30, 2015

(51) Int. Cl.
*G02B 6/26* (2006.01)
*H04N 9/31* (2006.01)
(52) U.S. Cl.
CPC ............... *G02B 6/262* (2013.01); *H04N 9/317* (2013.01)

(58) Field of Classification Search
CPC .. G02B 6/12007; G02B 6/29395; G02B 6/26; H04J 14/02
USPC .................. 385/15, 27, 31, 33, 901
See application file for complete search history.

(56) References Cited

U.S. PATENT DOCUMENTS 7,766,557 B2 *   8/2010   Durrant ........................ 385/88
2010/0002202 A1 *  1/2010   Dierks et al. ................. 353/85

* cited by examiner

*Primary Examiner* — Jennifer Doan
(74) *Attorney, Agent, or Firm* — GTC Law Group LLP & Affiliates (57) ABSTRACT

An apparatus and method for flexible configuring of optical fibers to illuminate digital projectors. The optical fibers are attached to various positions of a configurable back plane assembly and a condensing assembly condenses the light beams prior to launch into the projector. Horizontal and vertical launch symmetries are maintained for any number of optical fibers between 1 and 9.

6 Claims, 13 Drawing Sheets

FIG. 13

CONFIGURABLE OPTICAL COUPLING

BACKGROUND OF THE INVENTION

Laser light sources may be coupled into digital projection systems using various components such as optical fibers, lenses, diffusers, and mixing rods. It is challenging to maintain brightness and color uniformity when different numbers of laser light sources are used in different projection systems. For example, a high-output projection system may require 5 green lasers and a low-output projection system may require 2 green lasers. Conventional optical designs require different launch assemblies designed for each case to maintain uniformity.

SUMMARY OF THE INVENTION

In general, in one aspect, an optical apparatus that includes an optical fiber, a configurable back plane assembly, and a condensing assembly. The optical fiber attaches to a position of the configurable back plane assembly. The optical fiber illuminates the condensing assembly.

Implementations may include one or more of the following features. There may be a mixing rod illuminated by the condensing assembly. There may be a digital projector illuminated by the mixing rod. There may be a multiplicity of optical fibers attached to positions of the configurable back plane and illuminating the condensing assembly. The pattern of spots formed by the condensing assembly on the mixing rod may depend on the positions of the optical fibers. The pattern of spots may be symmetrical in the x and y directions of the mixing rod. The long axis of the pattern of spots may be oriented to extend across the short axis of the mixing rod. The pattern of spots may include two to nine spots.

In general, in one aspect, an optical coupling method that includes the steps of generating light and transmitting it over an optical fiber, generating another light and transmitting it over another optical fiber, holding both optical fibers in a configurable back plane assembly, and condensing the light from the optical fibers with a condensing assembly.

Implementations may include one or more of the following features. The output of the condensing assembly may be coupled to a mixing rod. The output of the mixing rod may be coupled to a digital projector. The pattern of spots from the condensing assembly may depend on the positions of the fibers. The pattern of spots may be symmetrical in the x and y directions. The long axis of the pattern of spots may be oriented to extend across the short axis of the mixing rod. The pattern of spots may include two to nine spots.

DETAILED DESCRIPTION

Laser projection systems require optical coupling between the lasers and the projector. For cinema systems, there are often advantages for separating the lasers from the projector, thus the light may be transmitted from the laser to the projector through fiber optics. This allows the lasers to be located a distance away from the projector. A small number of fibers, in the range of one to nine for each color, is a low-cost and practical way to carry light when each laser has output power in the range of approximately 10 to 200 W. If the lasers are significantly less than 10 W each, a number of small lasers may be aggregated per optical fiber to reach the range of 10 to 200 W per optical fiber.

Projectors that use digital light processing (DLP) light valves typically couple light into the projector with mixing rods (also called integrating rods). The mixing rod uses multiple bounces inside a rectangular rod of glass to help make the light uniform and achieve sufficient uniformity on the projection screen in both brightness and color. Although longer mixing rods can achieve better uniformity, there are limitations on the length that will fit in projection systems which have an overall maximum length defined by the overall size of the projector. There has been a long-standing need in the laser-projection industry to improve uniformity when a small number of optical fibers are used for coupling.

Figure 1:
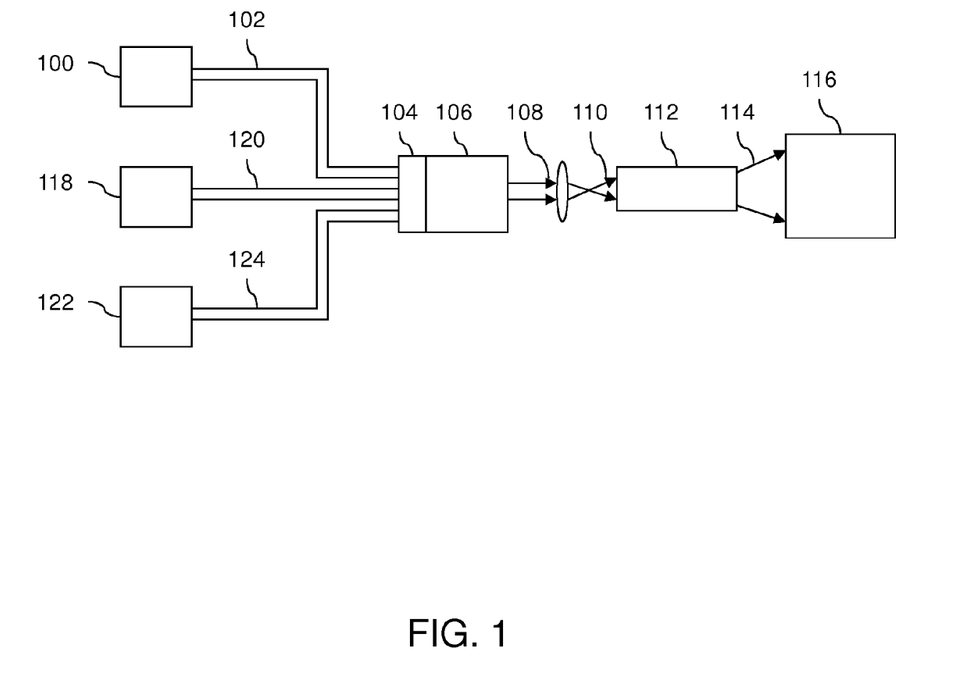
FIG. 1 is a block diagram of a configurable optical coupling in a projection system.

FIG. 1 shows a block diagram of a configurable optical coupling in a projection system. First laser 100 illuminates first optical fiber 102. First optical fiber is attached to and held by configurable back plane assembly 104. Configurable back plane assembly 104 is attached to condensing assembly 106. Condensing assembly 106 form first beam 108. First beam 108 illuminates coupling lens 108. Coupling lens 108 form second beam 110. Second beam 110 illuminates mixing rod 112. Mixing rod 112 forms third beam 114. Third beam 114 illuminates projector 116. Second laser 118 illuminates second optical fiber 120. Second optical fiber 120 is attached to and held by configurable back plane assembly 104. Third laser 122 illuminates third optical fiber 124. Third optical fiber 124 is attached to and held by configurable back plane assembly 104. In this example, three lasers and three optical fibers are shown attached to the configurable back plane assembly, but any number of lasers and fibers may be attached. Coupling optics between lasers and optical fibers are not shown in FIG. 1. Coupling lens 108 may be replaced by any combination of lenses, diffusers, or other optical elements that are able to appropriately illuminate mixing rod 112. Mixing rod 112 may be incorporated into projector 116.

Figure 2A:
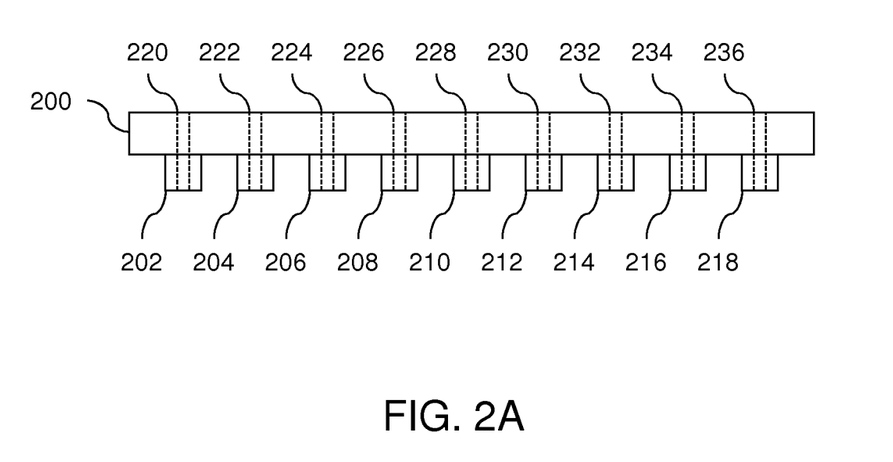
FIG. 2A is a top view of a configurable back plane assembly.
Figure 2B:
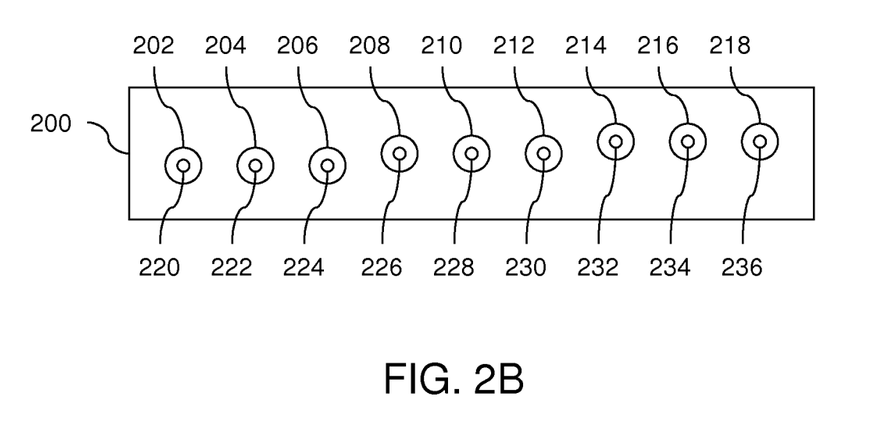
FIG. 2B is a front view of a configurable back plane assembly.

FIG. 2A shows a top view of a configurable back plane assembly. FIG. 2B shows a front view of the same configurable back plane assembly. The configurable back plane assembly holds from one to nine optical fibers in the proper position for illuminating a condensing assembly. Plate 200 holds nine optical fiber receptacles 202, 204, 206, 208, 210, 212, 214, 216, and 218. The optical fiber receptacles have holes 220, 222, 224, 226, 228, 230, 232, 234, and 236. Optical fibers (not shown) may be attached to the optical fiber receptacles and the light emitted from the optical fibers passes through the holes and illuminates a condensing assembly.

Figure 3A:
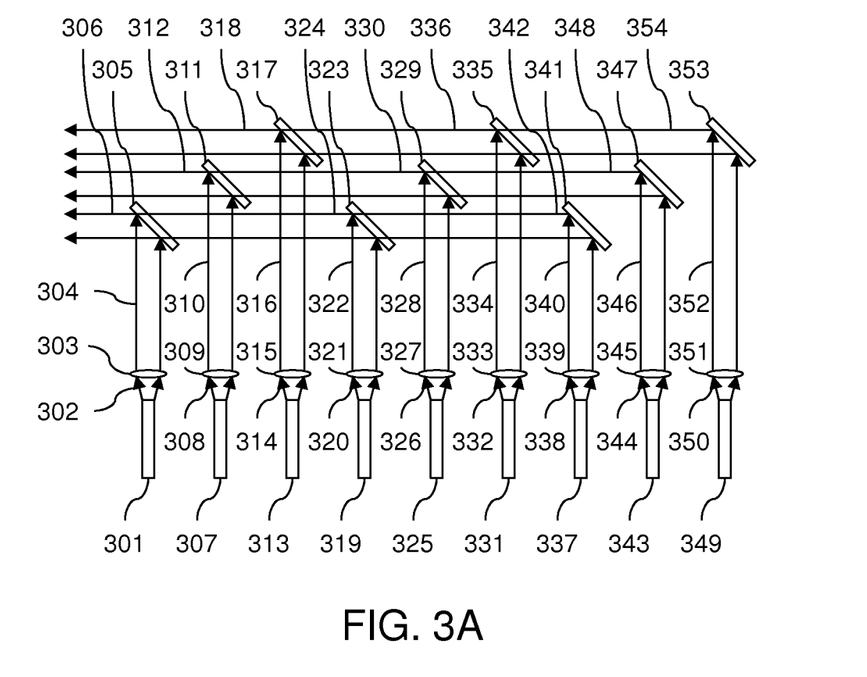
FIG. 3A is a top view of a condensing assembly.
Figure 3B:
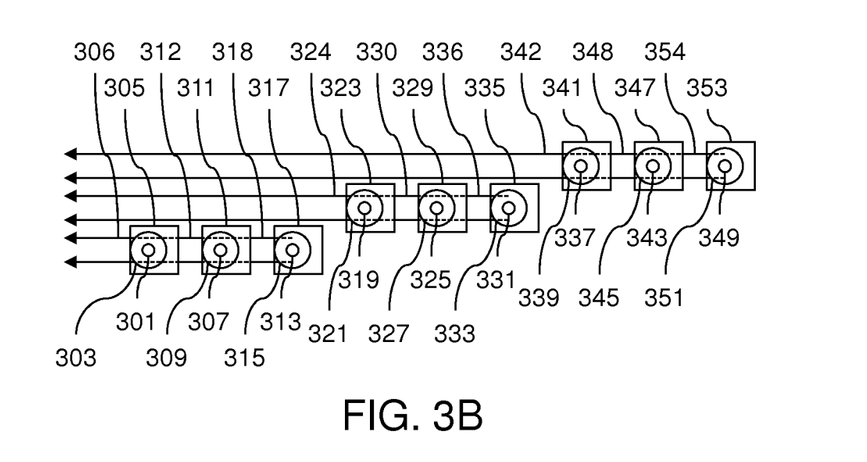
FIG. 3B is a front view of a condensing assembly.

FIG. 3A shows a top view of a condensing assembly. FIG. 3B shows a front view of the same condensing assembly. First optical fiber 301 generates first beam 302. First beam 302 illuminates first collimating lens 303. First collimating lens 303 generates second beam 304. Second beam 304 reflects from first mirror 305. First mirror 305 generates third beam 306. Second optical fiber 307 generates fourth beam 308. Fourth beam 308 illuminates second collimating lens 309. Second collimating lens 309 generates fifth beam 310. Fifth beam 310 reflects from second mirror 311. Second mirror 311 generates sixth beam 312. Third optical fiber 313 generates seventh beam 314. Seventh beam 314 illuminates third collimating lens 315. Third collimating lens 315 generates eighth beam 316. Eighth beam 316 reflects from third mirror 317. Third mirror 317 generates ninth beam 318. Fourth optical fiber 319 generates tenth beam 320. Tenth beam 320 illuminates fourth collimating lens 321. Fourth collimating lens 321 generates eleventh beam 322. Eleventh beam 322 reflects from fourth mirror 323. Fourth mirror 323 generates twelfth beam 324. Fifth optical fiber 325 generates thirteenth beam 326. Thirteenth beam 326 illuminates fifth collimating lens 327. Fifth collimating lens 327 generates fourteenth beam 328. Fourteenth beam 328 reflects from fifth mirror 329. Fifth mirror 329 generates fifteenth beam 330. Sixth optical fiber 331 generates sixteenth beam 332. Sixteenth beam 332 illuminates sixth collimating lens 333. Sixth collimating lens 333 generates seventeenth beam 334. Seventeenth beam 334 reflects from fifth mirror 335. Fifth mirror 335 generates eighteenth beam 336. Seventh optical fiber 337 generates nineteenth beam 338. Nineteenth beam 338 illuminates seventh collimating lens 339. Seventh collimating lens 339 generates twentieth beam 340. Twentieth beam 340 reflects from seventh mirror 341. Seventh mirror 341 generates twenty first beam 342. Eighth optical fiber 343 generates twenty second beam 344. Twenty second beam 344 illuminates eighth collimating lens 345. Eighth collimating lens 345 generates twenty third beam 346. Twenty third beam 346 reflects from eighth mirror 347. Eighth mirror 347 generates twenty fourth beam 348. Ninth optical fiber 349 generates twenty fifth beam 350. Twenty fifth beam 350 illuminates ninth collimating lens 351. Ninth collimating lens 351 generates twenty sixth beam 352. Twenty sixth beam 352 reflects from ninth mirror 353. Ninth mirror 353 generates twenty seventh beam 354. A configurable back plane may be utilized to hold the optical fibers in the proper position for launch into the condensing assembly. The configurable back plane separates the optical fibers in the horizontal direction for easy attachment to the fiber receptacles and separates the optical fibers in the vertical direction at the proper spacing to achieve closely packed output beams in the vertical direction. First mirror 305, second mirror 311, third mirror 317, fourth mirror 323, fifth mirror 329, sixth mirror 335, seventh mirror 341, eighth mirror 347, and ninth mirror 353 are used to condense the beams to achieve closely packed output beams in the horizontal direction.

Figure 4:
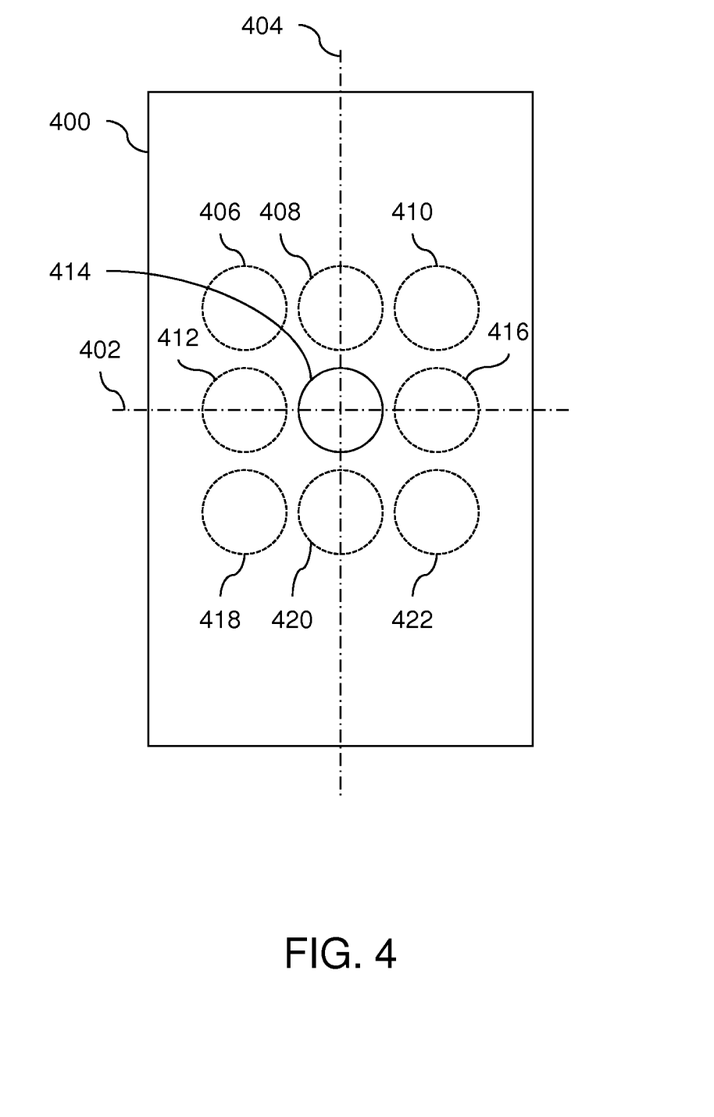
FIG. 4 is a front view of one spot on a mixing rod.

FIG. 4 shows a front view of one spot on a mixing rod. The output beams from the condensing assembly form a closely packed pattern with spots that depend on which optical fibers are attached to the configurable back plane assembly. In the case of a very low power projection system, only one optical fiber is attached. In the case of a very high power projection system, all nine optical fibers are attached. Power levels in between those two extremes are achieved with various numbers of optical fibers attached. FIG. 4 shows the illumination of the input face of a mixing rod with one optical fiber attached. Mixing rod 400 is illuminated by fifth spot 414. The illumination pattern is symmetrical about horizontal axis 402 and symmetrical about vertical axis 404. First spot 406, second spot 408, third spot, 410, fourth spot 412, sixth spot 416, seventh spot 418, eighth spot 420, and ninth spot 422 (shown with dashed circles) are not used in this pattern of spots.

Figure 5:
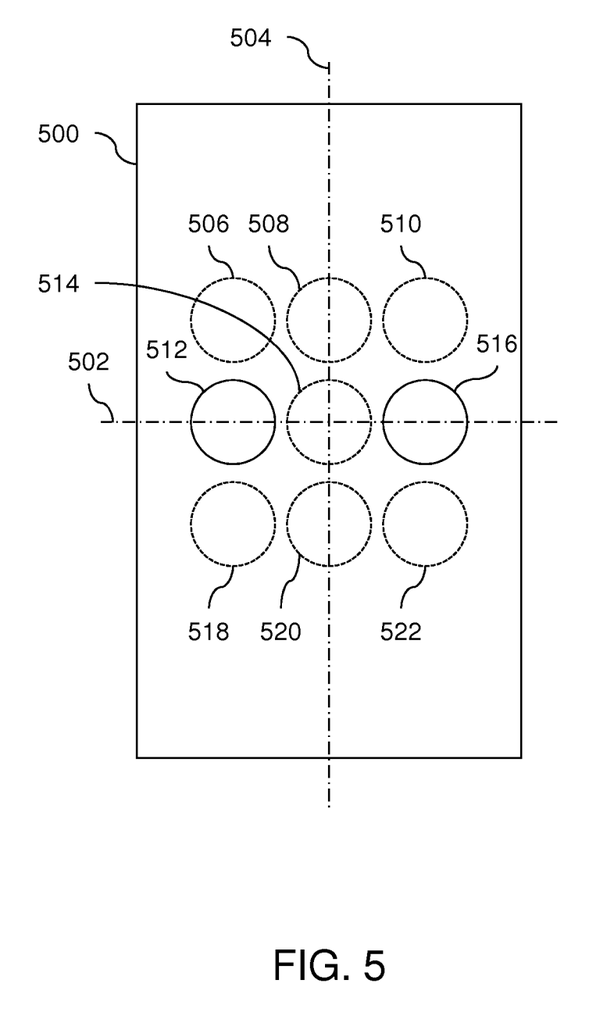
FIG. 5 is a front view of two spots on a mixing rod.

FIG. 5 shows a front view of two spots on a mixing rod. Mixing rod 500 is illuminated by fourth spot 512 and sixth spot 516. The illumination pattern is symmetrical about horizontal axis 502 and symmetrical about vertical axis 504. First spot 506, second spot 508, third spot, 510, fifth spot 514, seventh spot 518, eighth spot 520, and ninth spot 522 (shown with dashed circles) are not used in this pattern of spots.

Figure 6:
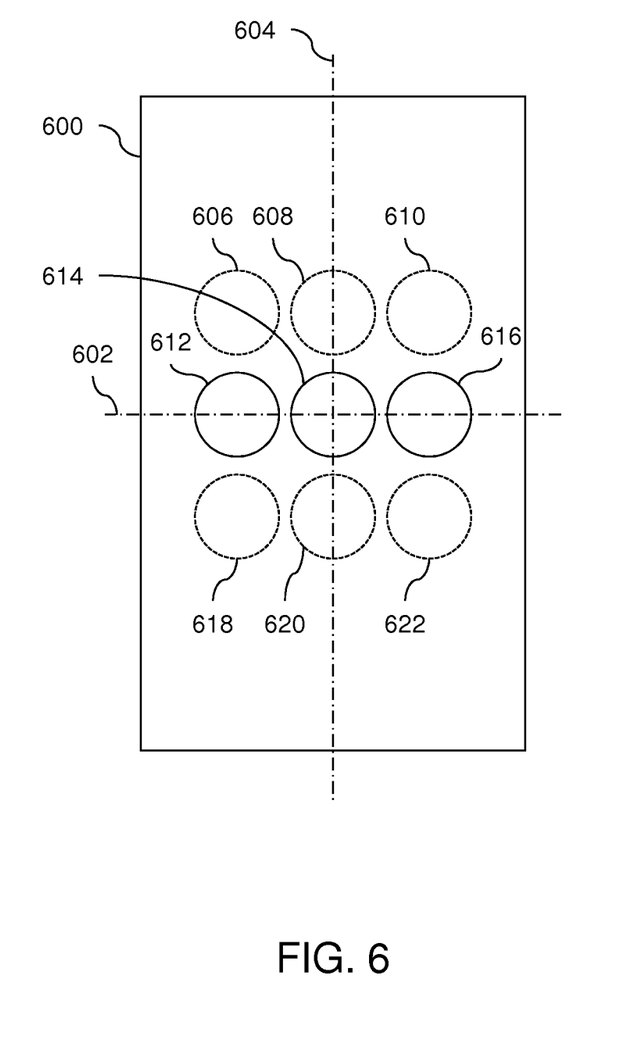
FIG. 6 is a front view of three spots on a mixing rod.

FIG. 6 shows a front view of three spots on a mixing rod. Mixing rod 600 is illuminated by fourth spot 612, fifth spot 614, and sixth spot 616. The illumination pattern is symmetrical about horizontal axis 602 and symmetrical about vertical axis 604. First spot 606, second spot 608, third spot, 610, seventh spot 618, eighth spot 620, and ninth spot 622 (shown with dashed circles) are not used in this pattern of spots.

Figure 7:
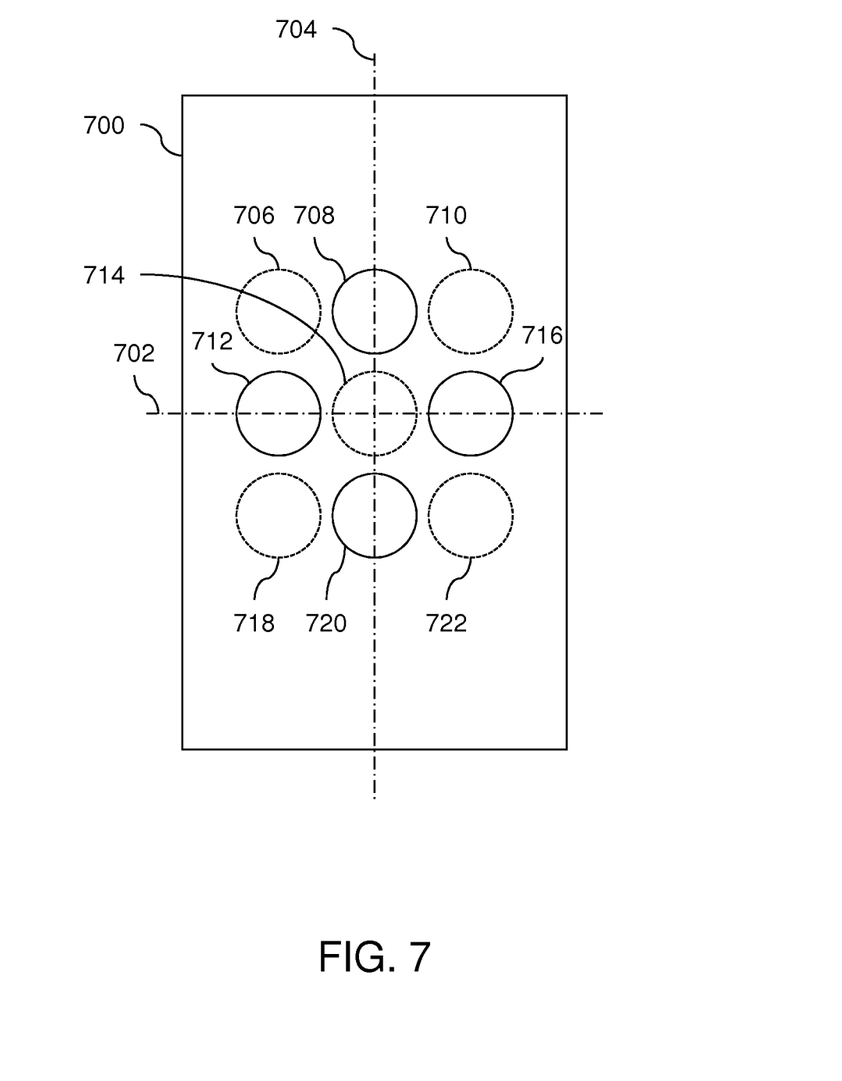
FIG. 7 is a front view of four spots on a mixing rod.

FIG. 7 shows a front view of four spots on a mixing rod. Mixing rod 700 is illuminated by second spot 708, fourth spot 712, sixth spot 716, and eighth spot 720. The illumination pattern is symmetrical about horizontal axis 702 and symmetrical about vertical axis 704. First spot 706, third spot 710, fifth spot 714, seventh spot 718, and ninth spot 722 (shown with dashed circles) are not used in this pattern of spots.

Figure 8:
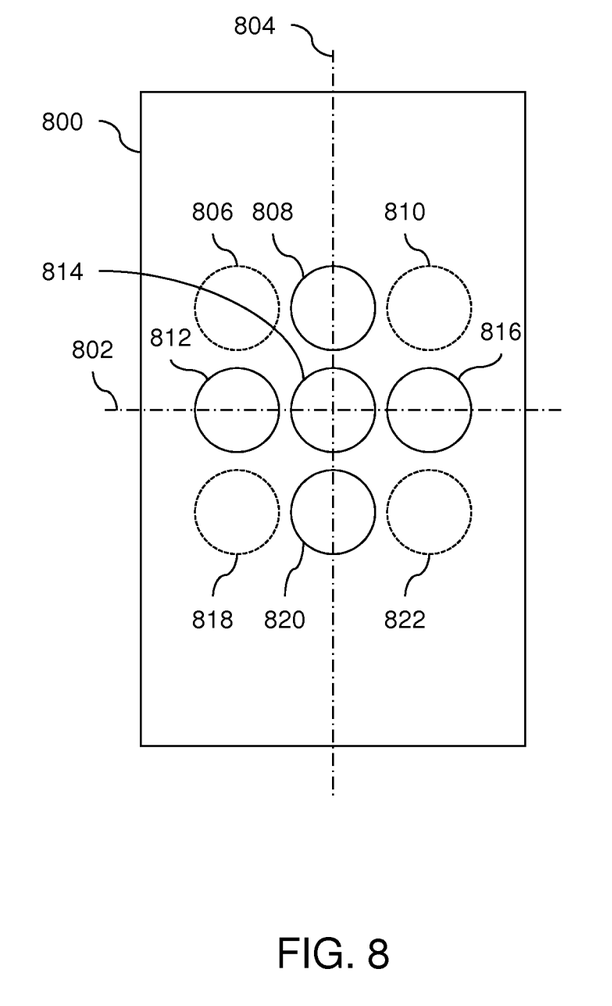
FIG. 8 is a front view of five spots on a mixing rod.

FIG. 8 shows a front view of five spots on a mixing rod. Mixing rod 800 is illuminated by second spot 808, fourth spot 812, fifth spot 814, sixth spot 816, and eighth spot 820. The illumination pattern is symmetrical about horizontal axis 802 and symmetrical about vertical axis 804. First spot 806, third spot 810, seventh spot 818, and ninth spot 822 (shown with dashed circles) are not used in this pattern of spots.

Figure 9:
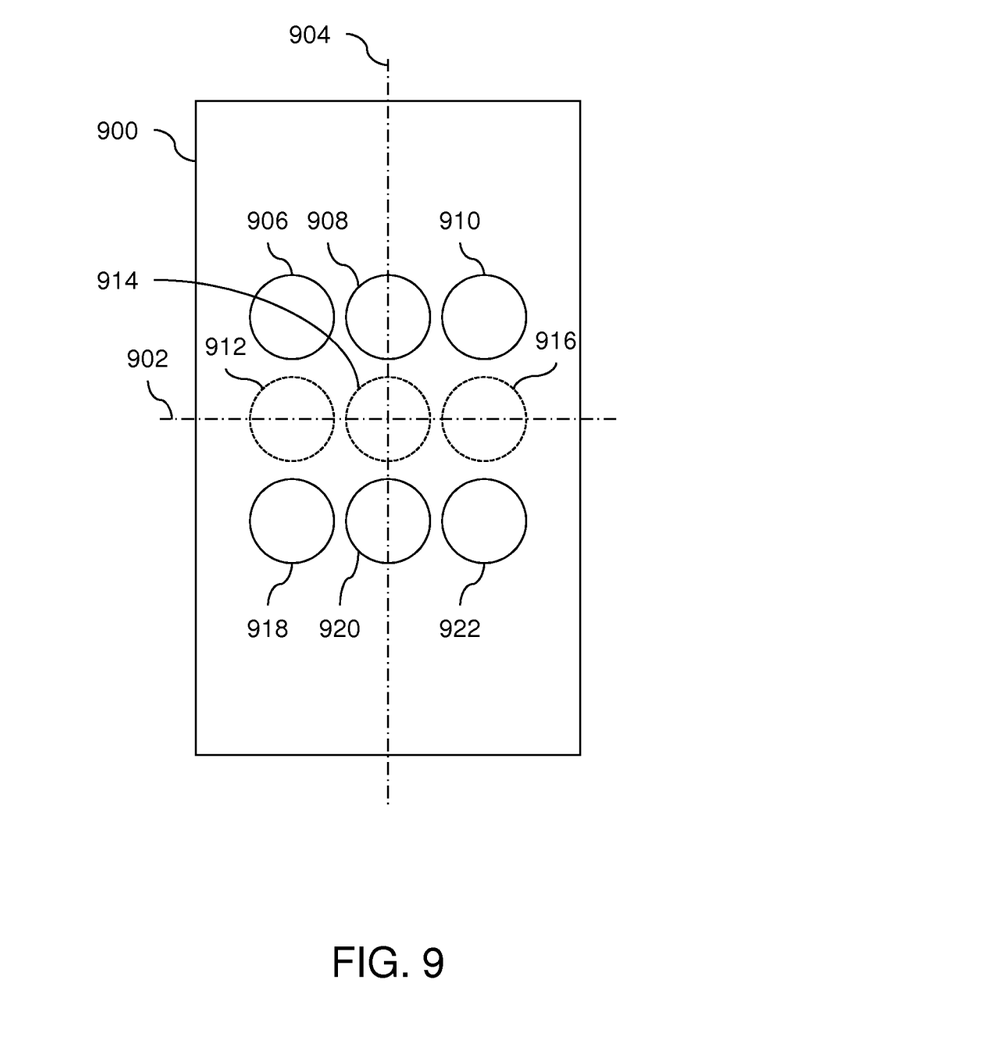
FIG. 9 is a front view of six spots on a mixing rod.

FIG. 9 shows a front view of six spots on a mixing rod. Mixing rod 900 is illuminated by first spot 906, second spot 908, third spot 910, seventh spot 918, eighth spot 920, and ninth spot 922. The illumination pattern is symmetrical about horizontal axis 902 and symmetrical about vertical axis 904. Third spot 912, fourth spot 914, and fifth spot 916 (shown with dashed circles) are not used in this pattern of spots.

Figure 10:
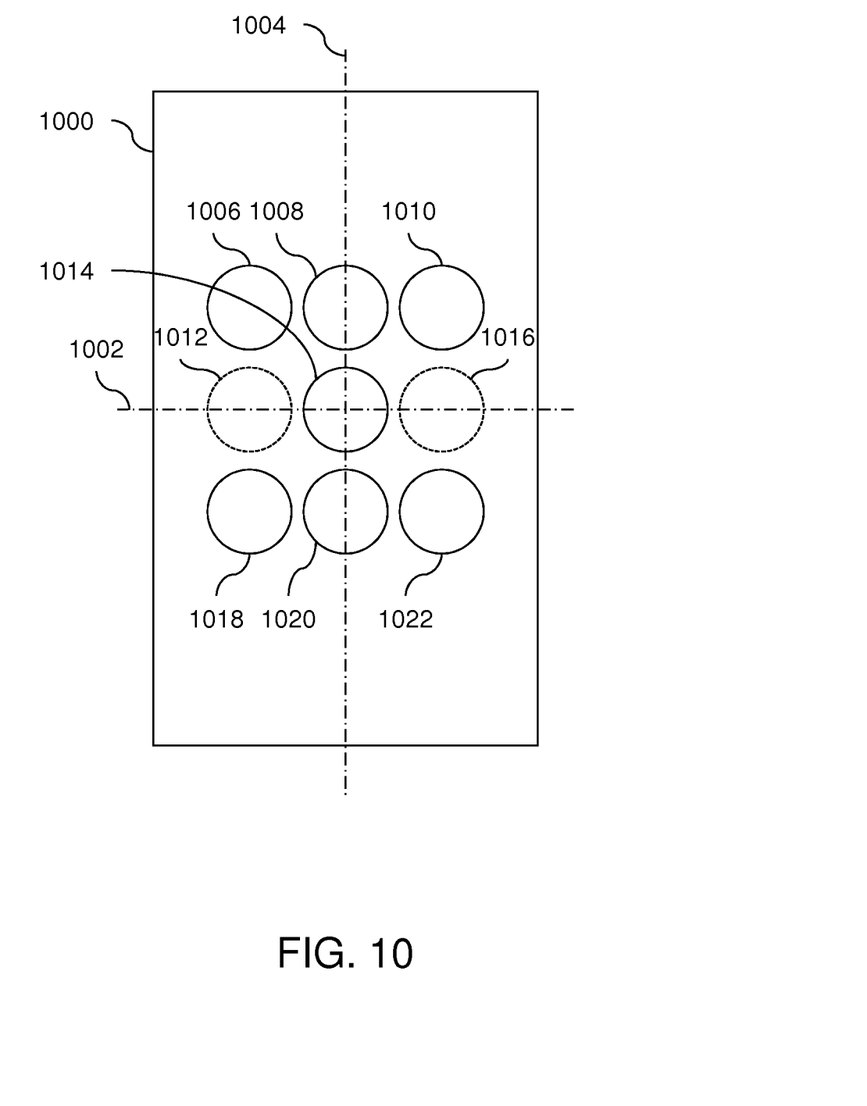
FIG. 10 is a front view of seven spots on a mixing rod.

FIG. 10 shows a front view of seven spots on a mixing rod. Mixing rod 1000 is illuminated by first spot 1006, second spot 1008, third spot 1010, fifth spot 1014, seventh spot 1018, eighth spot 1020, and ninth spot 1022. The illumination pattern is symmetrical about horizontal axis 1002 and symmetrical about vertical axis 1004. Third spot 1012 and fifth spot 1016 (shown with dashed circles) are not used in this pattern of spots.

Figure 11:
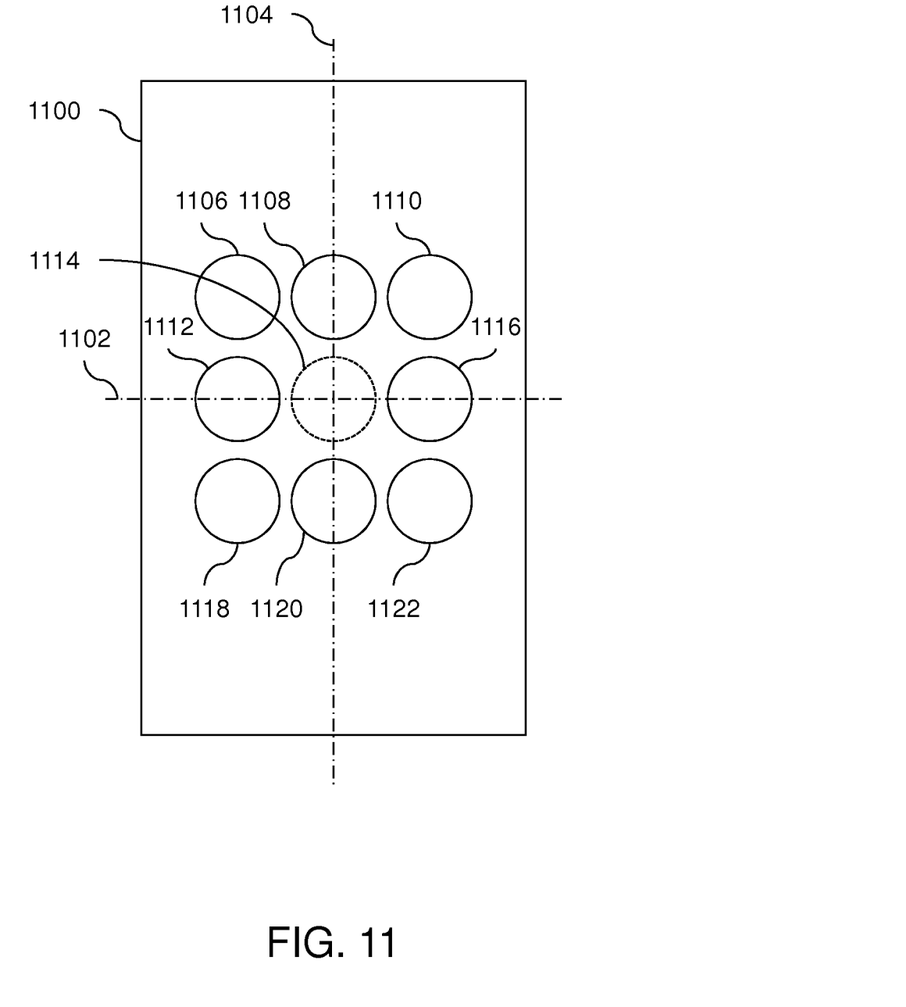
FIG. 11 is a front view of eight spots on a mixing rod.

FIG. 11 shows a front view of eight spots on a mixing rod. Mixing rod 1100 is illuminated by first spot 1106, second spot 1108, third spot 1110, fourth spot 1112, sixth spot 1116, seventh spot 1118, eighth spot 1120, and ninth spot 1122. The illumination pattern is symmetrical about horizontal axis 1102 and symmetrical about vertical axis 1104. Fifth spot 1114 (shown with a dashed circle) is not used in this pattern of spots.

Figure 12:
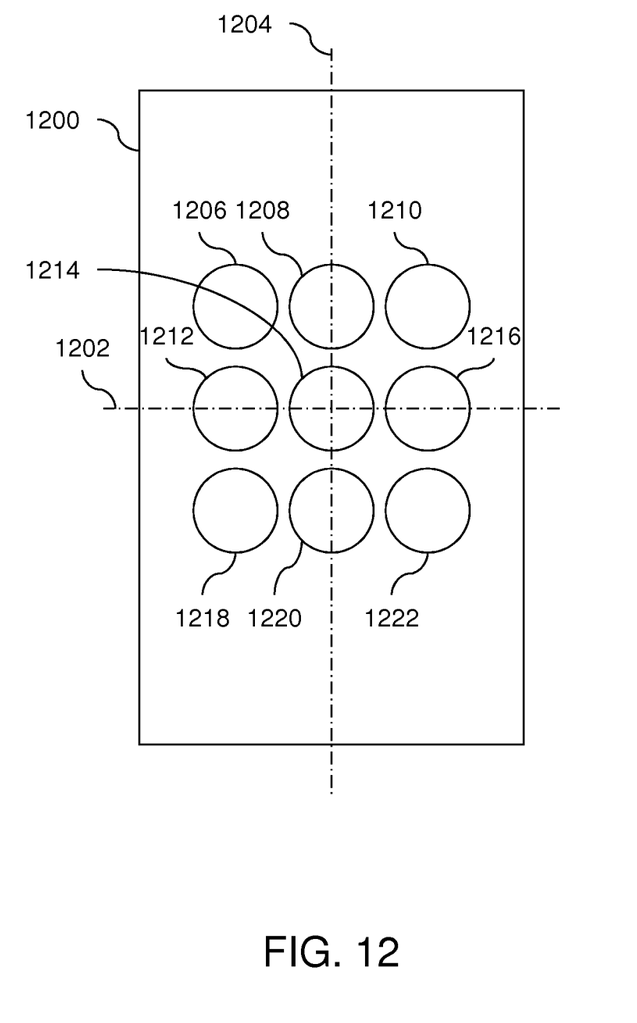
FIG. 12 is a front view of nine spots on a mixing rod.

FIG. 12 shows a front view of nine spots on a mixing rod. Mixing rod 1200 is illuminated by first spot 1206, second spot 1208, third spot 1210, fourth spot 1212, fifth spot 1214, sixth spot 1216, seventh spot 1218, eighth spot 1220, and ninth spot 1222. The illumination pattern is symmetrical about horizontal axis 1202 and symmetrical about vertical axis 1204.

Figure 13:
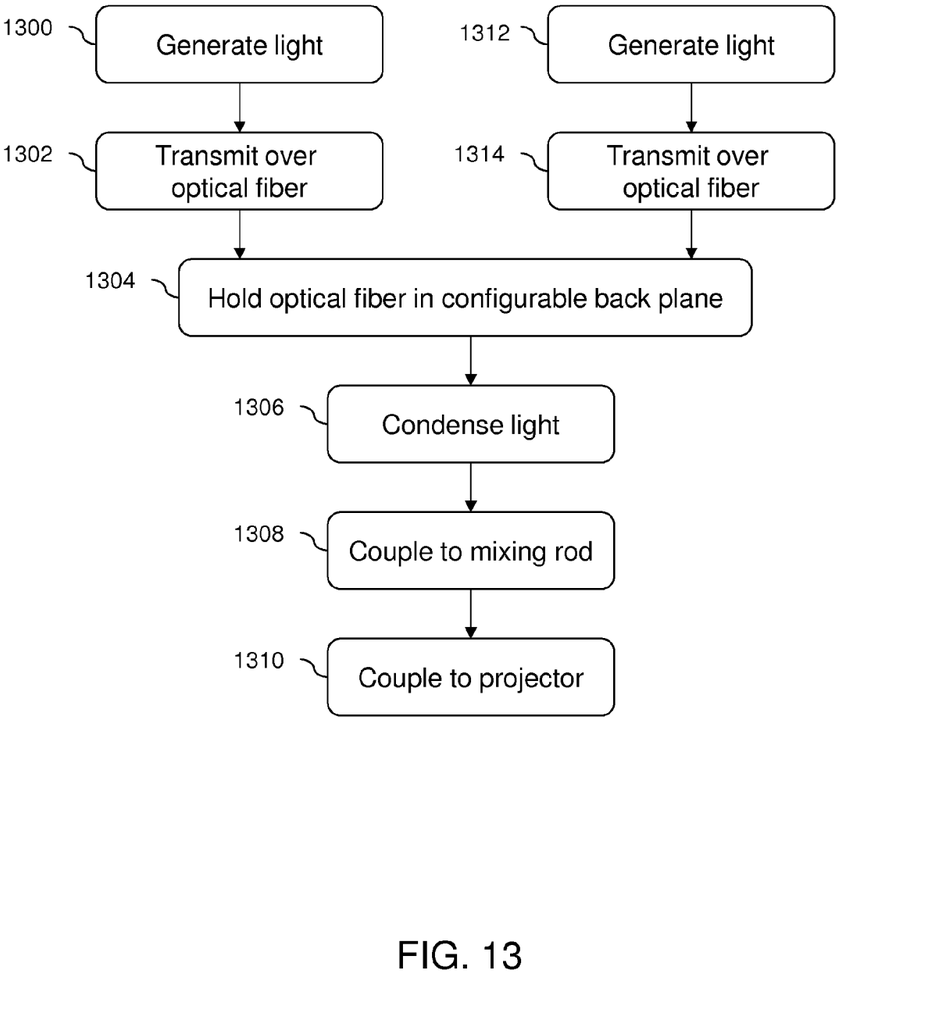
FIG. 13 is a flowchart of a configurable optical coupling method.

FIG. 13 shows a flowchart of a configurable optical coupling method. In step 1300, light is generated. In step 1302, the light is transmitted over an optical fiber. In step, 1304 the optical fiber is held in a configurable back plane. In step 1312, a second light is generated. In step 1314, the second light is transmitted over a second optical fiber. In step 1304, the second optical fiber is also held in the configurable back plane. In step 1306, the light from both optical fibers is combined and condensed. In step 1308, the condensed light is coupled to a mixing rod. In step 1310, the light from the mixing rod is coupled to a projector. In a similar way, more than two lights and fibers can be combined, condensed, and coupled to the projector.

Orthogonal symmetry in x and y axes across the orthogonal directions of the input face of a mixing rod are helpful to achieve excellent projection uniformity in both color and brightness. One possible configuration is to utilize a separate configurable back plane for each color. A typical full-color projection system would require three configurable back planes for red, green, and blue. In this case, conventional dichroic beamsplitters may be used to combine the three colors and then couple the light to the mixing rod. In another example, blue light may be carried by some of the optical fibers and a combination of green and red light may be carried in each of the other optical fibers. Two configurable back planes would then be sufficient.

It is preferable to arrange the long axis of the spot pattern (if any) to extend across the short axis of the mixing rod. This results in more bounces through the rod and improved uniformity. For example, in FIG. 6, fourth spot 612, fifth spot 614, and sixth spot, 616 are extended along the short axis of the mixing rod and this configuration is preferable to utilizing second spot 608, fifth spot 614, and eighth spot 620 which would be extended along the long axis of the mixing rod.

Other implementations are also within the scope of the following claims.

What is claimed is:

1. An optical coupling method comprising:
generating a first light;
transmitting the first light over a first optical fiber to produce a second light;
holding the first optical fiber in a first position of a configurable back plane assembly;
generating a third light;
transmitting the third light over a second optical fiber to produce a fourth light;
holding the second optical fiber in a second position of the configurable back plane assembly; and
condensing the second light and the fourth light in a condensing assembly.

2. The optical coupling method of claim 1 further comprising:
coupling the output of the condensing assembly to a mixing rod.

3. The optical coupling method of claim 2 further comprising:
coupling the output of the mixing rod to a digital projector.

4. The optical coupling method of claim 3 wherein a pattern of spots is formed by the condensing assembly; the pattern of spots depends on the first position and the second position; and the pattern of spots is symmetrical in an x-direction and a y-direction.

5. The optical coupling method of claim 4 wherein the pattern of spots has a long axis; and the long axis is oriented to extend across a short axis of the mixing rod.

6. The optical coupling method of claim 4 wherein the pattern of spots has two to nine spots.

* * * * *